United States Patent [19]

Mizokami

[11] 4,344,678

[45] Aug. 17, 1982

[54] DIAPHRAGM CONTROL DEVICE FOR CAMERA

[75] Inventor: Kazunori Mizokami, Hachioji, Japan

[73] Assignee: Olympus Optical Co., Ltd., Tokyo, Japan

[21] Appl. No.: 187,763

[22] Filed: Sep. 16, 1980

[30] Foreign Application Priority Data

Sep. 18, 1979 [JP] Japan .................. 54/119723

[51] Int. Cl.³ .................................. G03B 7/095
[52] U.S. Cl. ........................ 354/23 D; 354/44; 354/271
[58] Field of Search .............. 354/23 D, 29, 38, 44, 354/271, 274

[56] References Cited

U.S. PATENT DOCUMENTS 4,057,810 11/1977 Iwata .................. 354/23 D X
4,079,390 3/1978 Iwata et al. ........... 354/23 D X

FOREIGN PATENT DOCUMENTS 2517868 8/1976 Fed. Rep. of Germany .
2559766 8/1979 Fed. Rep. of Germany .
1514953 6/1978 United Kingdom .
1528766 10/1978 United Kingdom .

Primary Examiner—L. T. Hix
Assistant Examiner—S. D. Schreyer
Attorney, Agent, or Firm—Frishauf, Holtz, Goodman and Woodward

[57] ABSTRACT

There is provided a diaphragm control device for a camera which comprises a light receiving section to produce stop information corresponding to the brightness of a subject, a stepping motor to rotate stepwise in response to stop information from the light receiving section, and a coupling ring to operate a linking pin of a diaphragm mechanism in accordance with the rise of a mirror, whereby the manipulated variable of the linking pin of the diaphragm mechanism, i.e. the diaphragm opening, is controlled through the engagement between a stopper lever attached to the shaft of the stepping motor and a notch section formed in the coupling ring. The angle of rotation of the stepping motor is so set as not to overreach the middle angle between one of a plurality of initial stop angles of the stepping motor and another stop angle adjacent thereto.

13 Claims, 9 Drawing Figures

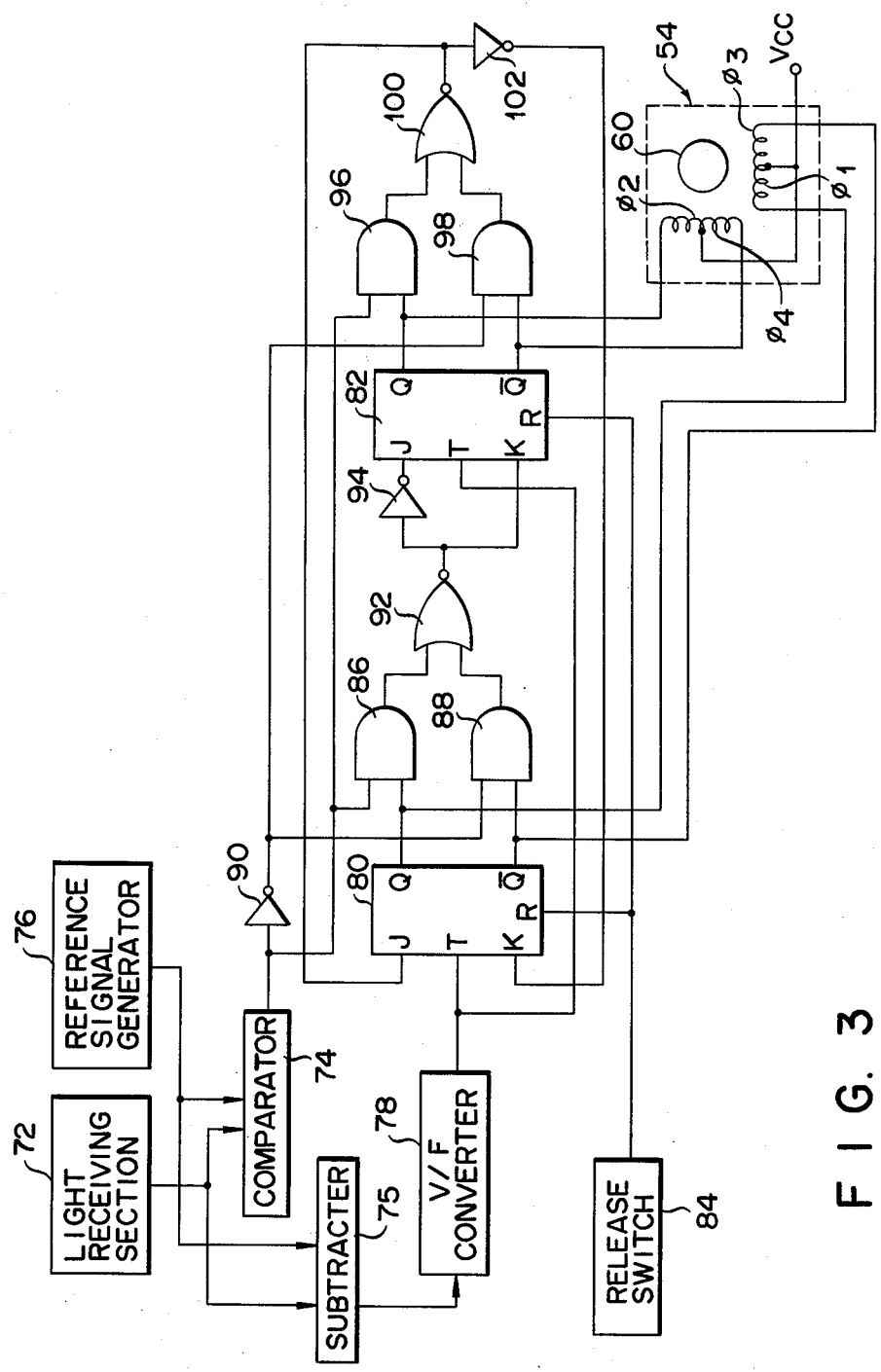
F I G. 3

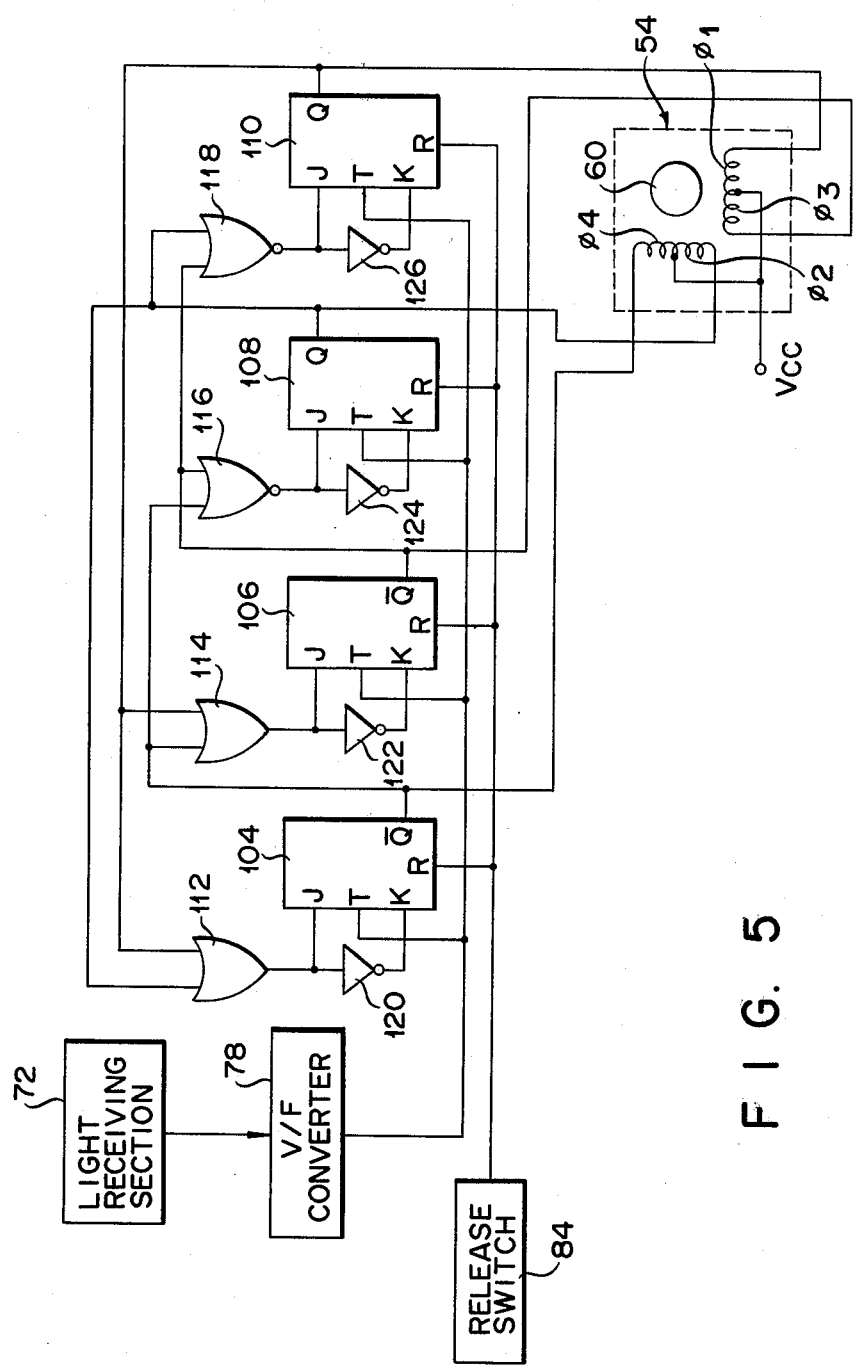
F I G. 5

DIAPHRAGM CONTROL DEVICE FOR CAMERA

BACKGROUND OF THE INVENTION

This invention relates to a diaphragm control device for a camera, and more specifically to a diaphragm control device using a stepping motor.

With the automation of the exposure control of cameras, cameras have recently been provided with diaphragm control devices. A diaphragm mechanism of a camera has a plurality of diaphragm leaves interlocking with one another to vary the size of a diaphragm opening. A linking pin is attached at right angles to one of these diaphragm leaves, and the diaphragm opening is changed in size by turning the linking pin around the optical axis of the camera. Conventionally, there has been proposed a diaphragm control device to control the angle of rotation of the linking pin of the diaphragm mechanism by using a stepping motor. In such device, a clock pulse corresponding to the brightness of a subject is supplied to the stepping motor to rotate the motor stepwise. A stopper lever is fixed on a shaft of the stepping motor. The diaphragm mechanism is so designed as to be urged in one direction to open or close the opening in response to a depression of e.g. a release button prior to a shutter operation. The size of the diaphragm opening is determined when the turn of the linking pin is prevented by the stopper lever in the middle of the urging of the diaphragm mechanism in the other direction.

After the shutter operation is finished, the diaphragm mechanism and the stepping motor must be restored to their respective reference positions. In an initial excitation state, the stepping motor has a plurality of stop positions provided by attraction and repulsion between electromagnets serving as a stator and permanent magnets arranged on a rotor. Although the diaphragm mechanism may easily be restored to its reference position by a spring, etc., the stepping motor cannot have its reference position fixed by the biasing force of a spring or the like. The reason is that the stepping motor cannot rotate stepwise against such biasing force because of its weak turning force. Accordingly, there has been proposed a system to rotate the stepping motor in the reverse direction by applying a pulse of opposite polarity thereto and to stop the rotation at the reference position by using an optical detector. With such system, however, the device cannot be reduced in size as well as in cost. Moreover, the detector will require additional power consumption. Alternatively, there is used a system in which the number of clock pulses supplied for the rotation of the stepping motor is previously stored, and the stepping motor is restored to the reference position by reversely applying pulses of such number to the stepping motor. This system, however, still requires an expensive memory device.

The object of this invention is to provide a diaphragm control device for a camera having a simple construction and capable of setting a diaphragm opening in accordance with the brightness of a subject and returning to a reference position after the performance of an operation of the camera and before the setting of the diaphragm opening for the next camera operation.

SUMMARY OF THE INVENTION

The above object may be attained by a diaphragm control device for a camera comprising a light receiving device which produces a pulse signal in accordance with the brightness of a subject, and a reset device producing a reset pulse in accordance with a shutter operation of the camera. A motor is connected to the light receiving device and reset device and includes a rotor which has a plurality of permanent magnets and a stator so arranged as to surround the rotor, the stator having a plurality of permanent magnets, the rotor having a plurality of stop positions in an initial state and, after being restored to a given stop position in response to the reset pulse, rotating within a range not overreaching the middle position between the given stop position and another stop position adjacent thereto in response to the pulse signal. A camera diaphragm is connected to the motor and has its diaphragm opening determined in accordance with the rotation of the motor.

BRIEF DESCRIPTION OF THE DRAWINGS

FIG. 3 is a circuit diagram of the embodiment of FIG. 1;

FIG. 5 is a circuit diagram of another embodiment of this invention; and

DETAILED DESCRIPTION

Figure 1:
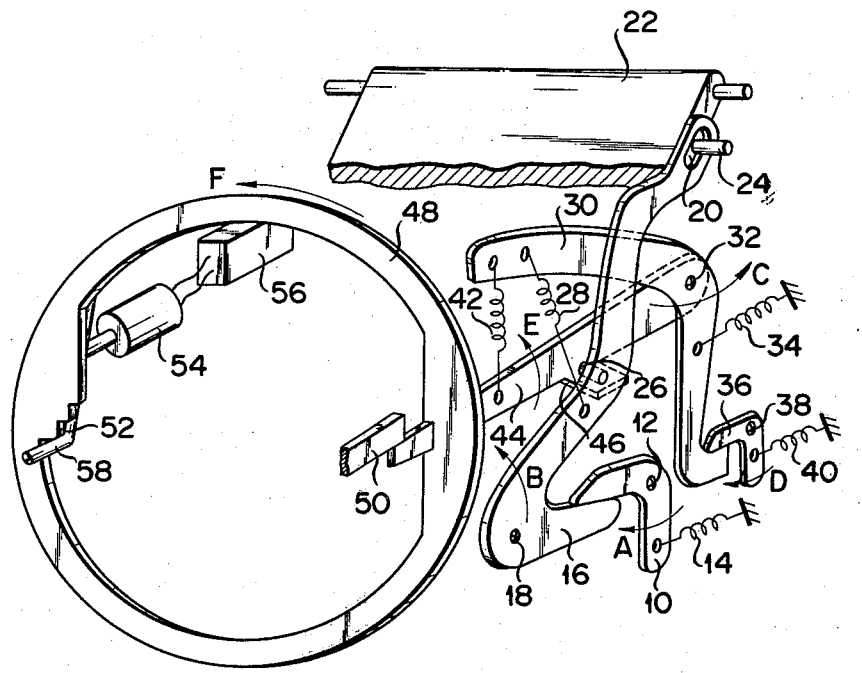
FIG. 1 is a perspective view of an embodiment of a diaphragm control device for a camera according to this invention.

FIG. 1 is a perspective view of an embodiment of the invention applied to a single-lens reflex camera, mainly showing the construction of a section near a mirror box of the camera. A mirror stopper lever 10 is pivoted to one side of the mirror box (not shown) by means of a pin 12. The mirror stopper lever 10 has one end connected with a spring 14 and biased thereby in the opposite direction to an arrow A and the other end engaging one end of a mirror lift lever 16. The mirror lift lever 16 is pivotted to the one side of the mirror box by means of a pin 18. The other end of the mirror lift lever 16 has a slit 20 which is penetrated by a pin 24 protruding from one side portion of a mirror 22. In the middle of the mirror lift lever 16, there is a pin 26 protruding toward the inside of the mirror box. The mirror lift lever 16 is connected with one end of a spring 28 the other end of which is coupled to one end of a mirror charge lever 30. Thus, the mirror lift lever 16 is biased in the direction of an arrow B. The mirror charge lever 30 is pivoted to the one side of the mirror box by means of a pin 32, and is normally biased in the direction of an arrow C by a spring 34. The other end of the mirror charge lever 30 engages one end of a charge stopper lever 36. The charge stopper lever 36 is pivoted to the one side of the mirror box by means of a pin 38, and is normally biased in the opposite direction to an arrow D by a spring 40. The one end of the mirror charge lever 30 is connected with one end of a spring 42 the other end of which is coupled to an actuating lever 44 located inside the mirror charge. One end of the actuating lever 44 is pivoted to the one side of the mirror box by means of the pin 32. Thus, the actuating lever 44 is biased in the direction of an arrow E by the spring 42. In the middle of the actuating lever 44, there is a projection plate 46 jutting out to the outside of the mirror box. The bias excursion of the actuating lever 44 in the direction of the arrow E reaches a position where such excursion is prevented by the engagement between the projection plate 46 and the pin 26 projected from the mirror lift lever 16.

The other end of the actuating lever 44 extends up to the front of the mirror box, and is inserted through a notch in a coupling ring 48 which is disposed around the optical axis in the front of the mirror box. Since the actuating lever 44 is biased in the direction of the arrow E, the coupling ring 48 is urged in the direction of an arrow F. A lens (not shown) is attached to the front of the coupling ring 48 by means of a mount section. In the case of the single-lens reflex camera, a diaphragm means (hereafter referred to as diaphragm mechanism) is incorporated in the lens. The diaphragm mechanism includes a plurality of diaphragm leaves disposed at right angles to the optical axis of the camera and interlocking with one another to vary the size of the diaphragm opening, and a linking pin being attached to one of these diaphragm leaves in parallel with the optical axis. The diaphragm opening may be changed in size by turning the linking pin around the optical axis. Normally, the diaphragm mechanism is so biased as to provide an open diaphragm. The tip end of such linking pin 50 of the diaphragm mechanism extends up to the forward end portion of the actuating lever 44. In this embodiment, the linking pin 50 is supposed to be biased in the opposite direction to the arrow F. When the linking pin 50 is in its maximum bias position, that is, when the diaphragm is open, the under surface of the linking pin 50 is to touch the top face of the actuating lever 44. At a portion of the coupling ring 48 opposite to the notch thereof, there is a notch section 52 having a plurality of stages (three stages in this embodiment). A stepping motor 54 and a driver 56 therefor are disposed on the opposite side of the mirror box to the side where the aforesaid levers are located. A stopper lever 58 to engage the notch section 52 is attached to the shaft of the stepping motor 54.

Figure 2:
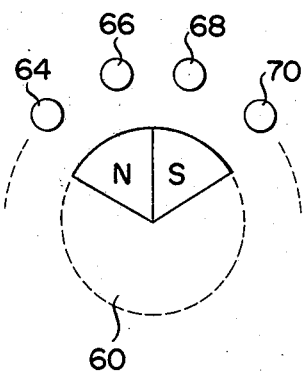
FIG. 2 shows a stepping motor used with the diaphragm control device of FIG. 1.

FIG. 2 shows the construction of the motor means which includes stepping motor 54. Here the stepping motor 54 is supposed to be a four-phase motor. A rotating disc 60 attached to a rotor is magnetized successively to N and S polarities along the circumferential direction. A plurality of four-phase pole pins are arranged in an arc around the rotating disc 60. First- and second-phase pole pins 64 and 66 are arranged correspondingly to an N-pole magnetic domain, while third- and fourth-phase pole pins 68 and 70 are arranged correspondingly to an S-pole magnetic domain. The excitation polarity of the pole pins is successively changed by the driver 56.

FIG. 3 shows a circuit diagram of the driver 56. The output terminal of a light receiving section 72 of a light receiving means, which receives optical information from a subject and produces a voltage signal corresponding to a proper stop value, is connected to one input terminal of a comparator 74 and one input terminal of a subtracter 75. The output terminal of a reference signal generator 76 is connected to the respective other input terminals of the comparator 74 and subtracter 75. An output signal from the subtracter 75 is supplied to the T-terminals of JK flip-flops 80 and 82 through a voltage-frequency (V/F) converter 78. A release switch 84 (reset means) to produce one pulse in response to a depression of a release button is connected to the R-terminals of the flip-flops 80 and 82. The Q- and $\overline{Q}$-terminals of the flip-flop 80 are connected respectively to one input terminals of AND gates 86 and 88, and also connected respectively to first- and third-phase windings $\phi1$ and $\phi3$. The first- and third-phase pole pins 64 and 68 are controlled for their conduction by these first- and third-phase windings $\phi1$ and $\phi3$, respectively. An output signal from the comparator 74 is supplied to the other input terminal of the AND gate 86, and is also supplied to the other input terminal of the AND gate 88 through an inverter 90. The output terminals of the AND gates 86 and 88 are connected to the input terminals of a NOR gate 92 the output terminal of which is connected to the input terminal of an inverter 94 and the K-terminal of the flip-flop 82. The output terminal of the inverter 94 is connected to the J-terminal of the flip-flop 82. The Q- and $\overline{Q}$-terminals of the flip-flop 82 are connected respectively to one input terminals of AND gates 96 and 98, and are also connected respectively to second- and fourth-phase windings $\phi2$ and $\phi4$. The second- and fourth-phase pole pins 66 and 70 are controlled for their conduction by these second- and fourth-phase windings $\phi2$ and $\phi4$, respectively. The output terminal of the comparator 74 is connected to the other input terminal of the AND gate 96, and the output terminal of the inverter 90 is connected to the other input terminal of the AND gate 98. The output terminals of the AND gates 96 and 98 are connected to the input terminals of a NOR gate 100 the output terminal of which is connected to the J-terminal of the flip-flop 80 and is also connected to the K-terminal of the flip-flop 80 through an inverter 102. Junctions between the first- and third-phase windings $\phi1$ and $\phi3$ and between the second- and fourth-phase windings $\phi2$ and $\phi4$ are connected to a power source $V_{CC}$.

Now there will be described the operation of the embodiment of the above-mentioned construction. The levers mounted on the side of the mirror box of the camera are supposed to be in the position shown in FIG. 1 when a film is wound up. When the release button is depressed, the mirror stopper lever 10 is rotated in the direction of the arrow A of FIG. 1 to be released from the engagement with the mirror lift lever 16. The mirror lift lever 16 is rotated in the direction of the arrow B by the spring 28 to raise the mirror 22. Following the rise of the pin 26 of the mirror lift lever 16 which has so far prevented the bias excursion of the actuating lever 44, the actuating lever 44 is rotated in the direction of the arrow E by the spring 42. As a result, the coupling ring 48 is rotated in the direction of the arrow F, and the linking pin 50 is rotated in the direction of the arrow F by the actuating lever 44 to reduce the diaphragm opening of the diaphragm mechanism. The reduction of the diaphragm opening depends on the angle of rotation of the coupling ring 48 before the notch section 52 of the coupling ring 48 comes in contact with the stopper lever 58. Namely, the size of the diaphragm opening can be varied by changing the stage of the notch section 52 which is to be caused to engage the stopper lever 58 by the rotation of the stepping motor 54. In this embodiment, the number of the stages of the notch section 52 is three, so that the diaphragm may be shifted between three stages. The stepping motor 54 is so designed that the stopper lever 58 may engage the central one of the three stages of the notch section 52 in the initial state. The stage to engage the stopper lever 58 is changed to vary the stop by rotating the stepping motor 54 by one step according to the brightness of the subject.

Now there will be described the operation of the circuit shown in FIG. 3, as well as the action of the stepping motor 54. When the release button of the reset means is depressed, a pulse is supplied from the release switch 84 interlocking with the release button to the R-terminals of the flip-flops 80 and 82 to reset these flip-flops. A voltage signal from the light receiving section 72, which corresponds to the proper stop value corresponding to the brightness of the subject, shutter speed and film sensitivity, is compared with an output signal from the reference signal generator 76 by the comparator 74. The output signal of the comparator 74 becomes a signal to designate the rotating direction of the stepping motor 54. On the other hand, the difference between the respective output signals of the light receiving section 72 and the reference signal generator 76 is operated by the subtractor 75, a signal corresponding to the difference is V/F-converted by the V/F converter 78, and pulses of a number (at most one pulse in this embodiment) corresponding to the voltage are supplied to the T-terminals of the flip-flops 80 and 82. Here the excitation state of the stator of the stepping motor 54 is controlled by output signals from the respective Q- and $\overline{Q}$-terminals of the flip-flops 80 and 82. The directions of the windings are so determined that the first- and third-phase pole pins 64 and 68 becomes S- and N-poles respectively when the first-phase winding $\phi 1$ is energized, that the first- and third-phase pole pins 64 and 68 become N- and S-poles respectively when the third-phase winding $\phi 3$ is energized, that the second- and fourth-phase pole pins 66 and 70 become S- and N-poles respectively when the second-phase winding $\phi 2$ is energized, and that the second- and fourth-phase pole pins 66 and 70 become N- and S-poles respectively when the fourth-phase winding $\phi 4$ is energized. Here, to energize a winding means to supply a low level signal to the winding.

Table 1 shows the shift of the output signals of the flip-flops 80 and 82. Here it is supposed that a high level signal is produced from the comparator 74.

TABLE 1

| Output Terminal | Timing | | | | | |
|---|---|---|---|---|---|---|
| | reset | 1 | 2 | 3 | 4 | ... |
| Q of F-F 80 | L | H | H | L | L | ... |
| Q of F-F 82 | L | L | H | H | L | ... |
| $\overline{Q}$ of F-F 80 | H | L | L | H | H | ... |
| $\overline{Q}$ of F-F 82 | H | H | L | L | H | ... |

Figure 4A:
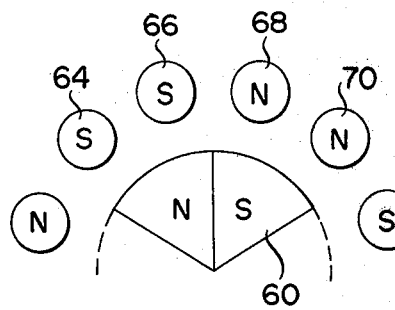
FIGS. 4A to 4C are performance diagrams of the stepping motor shown in FIG. 3.
Figure 4B:
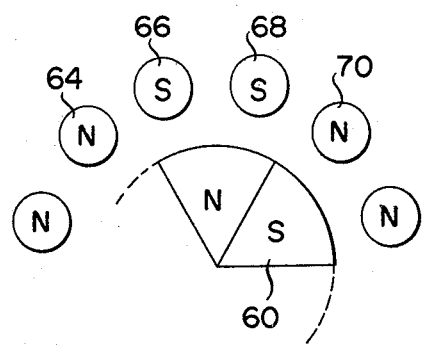
Figure 4C:
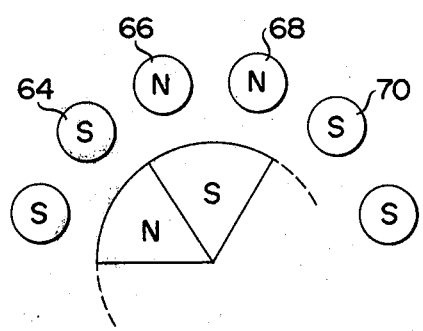

As may be seen from Table 1, the first- and second-phase windings $\phi 1$ and $\phi 2$ are energized at time of resetting, so that the excitation state of the pole pins is such that the first- and second-phase pins 64 and 66 becomes S-poles and the third- and fourth-phase pins 68 and 70 become N-poles. Accordingly, as shown in FIG. 4A, the N-pole magnetic domain of the rotating disc 60 of the stepping motor is attracted by the first- and second-phase pins 64 and 66, and the S-pole magnetic domain is attracted by the third- and fourth-phase pins 68 and 70. At the next timing, as shown in FIG. 4B, the N-pole magnetic domain is attracted by the second- and third-phase pole pins 66 and 68, and the rotating disc 60 of the stepping motor is rotated by one step for one pole pin. Thereafter, the stepping motor 54 is rotated stepwise at each timing. Naturally, when the output signal of the comparator 74 is at a low level, the shifting direction of the excitation state of the pole pins is reversed at timing 1, as shown in FIG. 4C, so that the stepping motor 54 is rotated stepwise in the reverse direction. Since at most one pulse is supplied to the T-terminals of the flip-flops 80 and 82 in this embodiment, the stepping motor 54 is rotated by only one step. At time of resetting, therefore, the stepping motor 54 is sure to be restored to the position shown in FIG. 4A. If the flip-flops 80 and 82 are reset as shown in Table 1 after the stepping motor 54 is rotated by two steps or more, the rotating disc 60 will stop at a position which corresponds to first- and second-phase pole pins of a pole pin pair adjacent to the illustrated pole pin pair, and the initial position shown in FIG. 4A will not be able to be obtained.

In this embodiment, the comparator 74 produces a high level output signal when the signal from the light receiving section 74 is higher than the output signal of the reference signal generator 72, that is, when the subject is bright. The rotating direction of the stepping motor 54 is determined so that the stopper lever 58 may engage the innermost stage of the notch section 52 when the output signal of the comparator 74 is at a high level, and that the stopper lever 58 may engage the outermost stage when the output signal is at a low level. Accordingly, when the subject is bright, the angle of rotation of the coupling ring 48 is increased before the notch section 52 engages the stopper lever 58, so that the linking pin 50 of the diaphragm mechanism is biased to an increased degree to reduce the diaphragm opening. Although the reset pulse of the flip-flops 80 and 82 is produced in response to the depression of the release button by means of the release switch 84 in the above-mentioned embodiment, such pulse may be produced in response to the rise of the mirror in the case of direct-photometry system which measures light transmitted to the film itself during the exposure.

By limiting the working range of the stepping motor, as described above, the stepping motor is allowed surely to return to the same initial position at resetting without requiring any special means. Although two pole pins are arranged in an arc around the rotating disc 60 corresponding to each magnetic domain of the rotating disc in the above embodiment, three or more pole pins may be arranged to increase the number of steps of the stepping motor.

FIG. 5 shows a circuit diagram of the drive circuit of the stepping motor 54 according to another embodiment of the invention. An output signal from a light receiving section 72 is supplied to the T-terminals of JK flip-flops 104, 106, 108 and 110 through a V/F converter 78. An output signal from a release switch 84 is supplied to the R-terminals of the flip-flops 104, 106, 108 and 110. The Q-terminal of the flip-flop 110 is connected to a first-phase winding $\phi 1$ and also to one input terminals of OR gates 112 and 114. The output terminal of the OR gate 112 is connected to the J-terminal of the flip-flop 104 and is also connected to the K-terminal of the flip-flop 104 through an inverter 120. The output terminal of the OR gate 114 is connected to the J-terminal of the flip-flop 106 and is also connected to the K-terminal of the flip-flop 106 through an inverter 122. The Q-terminal of the flip-flop 108 is connected to a second-phase winding $\phi 2$, one input terminal of a NOR gate 118 and the other input terminal of the OR gate 112. The output terminal of the NOR gate 118 is connected to the J-terminal of the flip-flop 110 and is also connected to the K-terminal of the flip-flop 110 through an inverter 126. The $\overline{Q}$-terminal of the flip-flop 106 is connected to a third-phase winding $\phi 3$, the other input terminal of the NOR gate 118 and one input terminal of a NOR gate 116. The output terminal of the NOR gate 116 is connected to the J-terminal of the flip-flop 108 and is also connected to the K-terminal of the flip-flop 108 through an inverter 124. The $\overline{Q}$-terminal of the flip-flop 104 is connected to a fourth-phase winding $\phi 4$ and the respective other input terminals of the OR gate 114 and the NOR gate 116. Like the case of the foregoing embodiment, the pole pins 64, 66, 68 and 70 are controlled for their conduction by the windings $\phi 1$, $\phi 2$, $\phi 3$ and $\phi 4$, respectively. Junctions between the first- and third-phase windings $\phi 1$ and $\phi 3$ and between the second- and fourth-phase windings $\phi 2$ and $\phi 4$ are connected to a power source $V_{CC}$.

In this embodiment, the stepping motor 54 is supposed to rotate only in one direction. Therefore, pulses of a number corresponding to the very output signal of the light receiving section 72 are supplied to the flip-flops 104, 106, 108 and 110. Table 2 shows the shift of the output signals of the flip-flops 104, 106, 108 and 110.

TABLE 2

| Output Terminal | Timing | | | | | |
|---|---|---|---|---|---|---|
| | reset | 1 | 2 | 3 | 4 | ... |
| Q of F-F 110 | L | L | H | H | H | ... |
| Q of F-F 108 | L | L | L | L | H | ... |
| $\overline{Q}$ of F-F 106 | H | L | L | L | L | ... |
| $\overline{Q}$ of F-F 104 | H | H | H | L | L | ... |

Figure 6A:
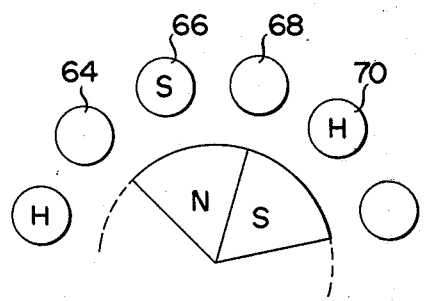
FIGS. 6A and 6B are performance diagrams of the stepping motor shown in FIG. 5.
Figure 6B:
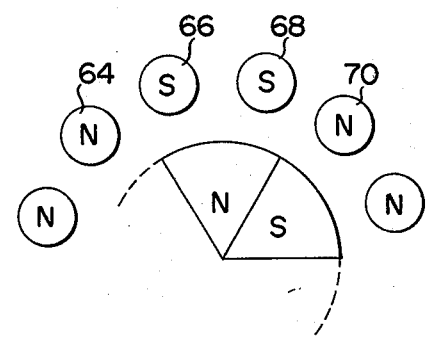

As may be seen from Table 2, the excitation state at time of resetting is the same as that in the first embodiment. At the next timing, however, neither of the first- and third-phase windings $\phi 1$ and $\phi 3$ is energized, but only the second-phase winding $\phi 2$ is energized, so that the stepping motor 54 is rotated by $\frac{1}{2}$ step, as shown in FIG. 6A. At timing 2, the second- and third-phase windings $\phi 2$ and $\phi 3$ are energized to provide the same excitation state (FIG. 6B) as the state obtained at timing 1 in the first embodiment (FIG. 4B). Thereafter, N- and S-polarities appear alternately with unexcited pins therebetween at odd-numbered timings, and the pole pins bear the excitation polarities, N and S, in pairs at even-numbered timings. Namely, in this embodiment, the stepping motor is rotated by $\frac{1}{2}$ step at each timing. When using the driver circuit of FIG. 4, resetting will be sure to restore the stepping motor 54 to the same position even if the motor is excited up to timing 3. According to this embodiment, therefore, the diaphragm opening may vary between four stages, and the notch section 52 of the coupling ring 48, as shown in FIG. 1, is so designed as to have four stages. The stopper lever 58 corresponds to the outermost stage when the stepping motor 54 is in its initial position, and the stepping motor 54 is rotated to cause the stopper lever 58 to correspond to the innermost stage when the subject is bright. Thus, the linking pin 50 of the diaphragm mechanism is biased farthest in the direction of the arrow F of FIG. 1 to reduce the diaphragm opening.

What is claimed is:

1. A diaphragm control device for a camera having a shutter, comprising:

stepping motor means comprising a stator having an electromagnet having a plurality of poles, an excitation state of said poles of said electromagnet changing in response to a pulse signal supplied to said stator; and a rotor surrounded by said stator, said rotor comprising a permanent magnet having a plurality of poles, rotating through a predetermined angle every time an excitation state of said stator changes and being balanceable in a plurality of positions at the time of initial excitation of said stator;

reset means coupled to said motor means for performing the initial excitation of said stator in accordance with a shutter operation of a camera;

light receiving means for supplying to said stator a pulse signal in accordance with the brightness of a subject, said pulse signal comprising a plurality of pulses, the number of pulses of said pulse signal to be supplied to said stator being determined to cause said rotor to rotate through less than half the angle necessary for said rotor to rotate from one balanced position to an adjacent balanced position; and diaphragm means coupled to said motor means and having its diaphragm opening set in accordance with the rotation angle of said rotor.

2. A control device according to claim 1, wherein said light receiving means includes a light receiving section to produce a stop information signal corresponding to the brightness of the subject and a voltage-frequency converter connected to said light receiving section and converting said stop information signal into a pulse signal formed of pulses of a number corresponding to stop information.

3. A control device according to claim 2, wherein said light receiving means further includes a reference signal generator and a comparator connected to said light receiving section and to said reference signal generator, said comparator comparing said stop information signal and a reference signal and generating a comparison signal corresponding to the result of the comparison, said comparison signal being coupled to said motor means to designate the direction of rotation thereof.

4. A control device according to claim 3, wherein said motor means includes a driver connected to said light receiving means and to said reset means and producing a driving signal corresponding to said reset pulse and to said pulse signal; said stator is connected to said driver; said poles of said electromagnet are arranged around said rotor and divided into several groups each electromagnet group consisting of the same number of poles, every pole of one electromagnet group is excited to the same polarity of the pole of any other electromagnet group which is at the corresponding position; and each pole of said rotor corresponds to two adjacent poles of said stator.

5. A control device according to claim 4, wherein said driver comprises a plurality of flip-flops having output terminals as many as the poles in each electromagnet group of said stator, and produces in response to said reset pulse a signal to excite two halves of the poles in each electromagnet group severally to N- and S-polarities, and also produces in response to each pulse of said pulse signal a signal to shift the range in which the poles in each electromagnet group are excited to the same polarity by a degree corresponding to one pole in a direction corresponding to the comparison signal produced from said comparator.

6. A control device according to claim 2, wherein said motor means includes a driver connected to said light receiving means and to said reset means and producing a driving signal corresponding to said reset pulse and to said pulse signal; said stator is connected to said driver; said poles of said electromagnet are arranged around said rotor and divided into several groups, each electromagnet group consisting of the same number of poles, every pole of one electromagnet group is excited to the same polarity of the pole of any other electromagnet group which is at the corresponding position; and each pole of said rotor corresponds to two adjacent poles of said stator.

7. A control device according to claim 6 or 4, wherein said driver comprises a plurality of flip-flops having output terminals as many as the poles in each electromagnet group of said stator, and produces in response to said reset pulse a signal to excite two halves of the poles in each electromagnet group severally to N- and S-polarities, and also produces in response to each pulse of said pulse signal a signal to shift the range in which the poles in each electromagnet group are excited to the same polarity by a degree corresponding to one pole in the same direction.

8. A control device according to claim 6 or 4, wherein said driver comprises a plurality of flip-flops having output terminals as many as the poles in each electromagnet group of said stator, and produces in response to said reset pulse a signal to excite two halves of the poles in each electromagnet group severally to N- and S-polarities, and also produces in response to every two pulses of said pulse signal a signal to shift the range in which the poles in each electromagnet group are excited to the same polarity by a degree corresponding to one pole in the same direction.

9. A control device according to claim 1, wherein said reset means includes a switch to be closed in response to a depression of a shutter release button of the camera and to produce a reset pulse.

10. A control device according to claim 1, wherein said motor means further includes a stopper lever connected to a shaft, and said diaphragm means includes a plurality of diaphragm leaves normally urged only in one direction to open or close the lens opening of the camera and being prevented from being urged by engaging the stopper lever of said motor means.

11. A diaphragm control device for a camera having a shutter, comprising:
   stepping motor means comprising a stator having an electromagnet having a plurality of poles, an excitation state of said poles of said electromagnet changing in response to a pulse signal supplied to said stator; and a rotor surrounded by said stator, said rotor comprising a permanent magnet having a plurality of poles, rotating through a predetermined angle every time an excitation state of said stator changes and being balanceable in a plurality of positions at the time of initial excitation of said stator;
   light receiving means for supplying to said stator a pulse signal in accordance with the brightness of a subject, said pulse signal comprising a plurality of pulses, the number of pulses of said pulse signal be supplied to said stator being determined to cause said rotor to rotate through less than half the angle necessary for said rotor to rotate from one balanced position to an adjacent balanced position; and
   diaphragm means coupled to said motor means and having its diaphragm opening set in accordance with the rotation angle of said rotor.

12. A control device according to claim 1 or 11, wherein said camera is a single-lens reflex camera.

13. A diaphragm control device for a single-lens reflex camera having a shutter, a mirror box having two side faces and a moveable mirror, and a lens having a rotatable diaphragm ring, said mirror box facing said lens, comprising:
   an actuating lever provided at one of two side faces of said mirror box and coupled to said diaphragm ring of said lens, said actuating lever being biased in accordance with the upward movement of said mirror so that one end of said actuating lever causes said diaphragm ring of said lens rotate;
   light receiving means for producing a pulse signal in accordance with the brightness of a subject;
   a stepping motor having a rotor and means for rotating said rotor stepwise in accordance with said pulse signal, said stepping motor being provided at the other side face of said mirror box;
   a rotatable ring provided at the front face of said mirror box which faces said lens and being coupled with said end of said actuating lever at said one side face of said mirror box so that it rotates in accordance with the bias movement of said actuating lever, said rotatable ring having a step-like notch section having a plurality of notches at the side of said other side face of said mirror box; and
   a stopper lever for stopping the rotation of said rotatable ring, said stopper lever being coupled to said rotor of said stepping motor and engaged with one notch of said notch section to control where to stop the rotation of said rotatable ring.

* * * * *